United States Patent [19]

Buzby et al.

[11] Patent Number: 4,809,933

[45] Date of Patent: Mar. 7, 1989

[54] PORTABLE AIRCRAFT ARRESTING APPARATUS

[75] Inventors: Paul R. Buzby, Chadds Ford; Paul D. Reid, Springfield; Edmond S. Lopez, Havertown; Terence C. Kelly, Swathmore, all of Pa.

[73] Assignee: Wickes Manufacturing Company, Southfield, Mich.

[21] Appl. No.: 581,807

[22] Filed: Feb. 21, 1984

[51] Int. Cl.$^4$ .............................................. B64F 1/02
[52] U.S. Cl. .................................................. 244/110 C
[58] Field of Search ........... 244/110 R, 110 G, 110 C, 244/114 R, 110 F, 110 A; 254/380, 327, 224

[56] References Cited

U.S. PATENT DOCUMENTS

| Re. 25,887 | 10/1965 | Eames | 244/110 |
|---|---|---|---|
| 151,164 | 5/1874 | Scholeg | 254/380 |
| 2,604,303 | 7/1952 | Grady | 254/327 |
| 2,614,807 | 10/1952 | Curtis | 255/51 |
| 2,980,213 | 4/1961 | Van Zelm et al. | 188/1 |
| 3,172,625 | 3/1965 | Doolittle | 244/110 |
| 3,367,608 | 2/1968 | Charno et al. | 244/110 |
| 3,383,076 | 5/1968 | Van Zelm et al. | 244/110 |
| 3,468,500 | 9/1969 | Carlsson | 244/110 |
| 3,484,061 | 12/1969 | Niemkiewicz | 244/110 |
| 3,628,757 | 12/1971 | Carlsson | 244/110 C |
| 3,695,559 | 10/1972 | Cruger et al. | 244/110 C |
| 3,724,333 | 4/1973 | Fonden et al. | 244/110 F |
| 3,738,599 | 6/1973 | Borehag | 244/110 C |
| 3,810,595 | 5/1974 | Doolittle | 244/110 C |
| 3,827,660 | 8/1974 | Doolittle | 244/110 C |
| 4,044,979 | 8/1977 | Lemmo | 248/13 |
| 4,056,247 | 11/1977 | Bernard et al. | 244/110 C |
| 4,088,289 | 5/1978 | Wood et al. | 248/2 |
| 4,188,757 | 2/1980 | Smith, Jr. | 52/111 |
| 4,354,667 | 10/1982 | Svendsen | 254/380 |
| 4,456,205 | 6/1984 | Alavoine | 244/110 C |

OTHER PUBLICATIONS

GTW Advanced Development and Engineering Center, Four Page Brochure Entitled "Portarrest Mobile Aircraft Arresting System", Distributed Prior to Feb. 21, 1983.

Primary Examiner—Galen Barefoot
Attorney, Agent, or Firm—Body, Vickers & Daniels

[57] ABSTRACT

Portable aircraft arresting apparatus is comprised of a towable wheeled trailer providing a platform adapted to be anchored along a runway or landing strip and which carries component parts to selectively provide a cable-type or net-type aircraft arresting system. In connection with a net-type system, the platform includes a stanchion assembly including a stanchion mast. The mast is stored in a horizontal position relative to the platform and is elevated to an inclined position to support a net together with a like platform positioned on the opposite side of the landing strip. To accommodate selectivity and rapid conversion between cable and net-type systems, the platform on opposite sides of the landing strip are reversely oriented, and the stanchion assembly on one of the platforms is detached and reversely mounted on the platform for the inclined stanchion masts on opposite sides of the landing strip to be parallel to one another and inclined in the direction of landing.

13 Claims, 8 Drawing Sheets

PORTABLE AIRCRAFT ARRESTING APPARATUS

BACKGROUND OF THE INVENTION

This invention relates to the art of aircraft arresting systems and apparatus and, more particularly, to portable apparatus selectively operable to provide a cable-type or net-type arresting system.

Portable cable-type aircraft arresting equipment has been provided heretofore comprising a towable wheeled trailer carrying an energy absorber or brake unit and other equipment necessary to provide a self-contained unit for use in a cable-type system. As is known in connection with cable-type systems, the brake unit comprises a reel carrying tape having a free end for attachment to a pendant or cable which extends across the runway. In a portable cable-type system, two like vehicles are positioned on opposite sides of an air strip in reverse orientation relative to one another and with the tape ends aligned transversely to the runway, and the cable or pendant is attached to the ends of the tape. The trailer is ground supported with the trailer wheels elevated out of contact with ground, and the trailer is appropriately secured or anchored to the ground or to concrete anchors.

It is also known to provide aircraft runways with net-type arresting systems comprised of stanchion assemblies on opposite sides of the runway to support a net extending transversely across the runway, and corresponding energy absorbers or braking units. Heretofore, such net-type arresting gear has included stanchions which are often heavy structures, which are bulky and cumbersome, not capable of easy mobility, and require considerable time to install. Moreover, the stanchions and braking units require a corresponding transport system for delivery to a site of use, and then removal from the transport device for installation which is generally of a permanent nature. More particularly in this respect, such installation generally requires anchoring of the stanchions and brake units through the use of heavy concrete foundations. Considerable time is required to construct the foundations in addition to the time required thereafter to install the stanchions and brake units. It will be appreciated that such systems are undesirably expensive and that the time requirements for installation delay operational use of the arresting system. Furthermore, if selectivity is desired with respect to using a cable-type or net-type arresting system, separate systems and installation procedures are necessary to achieve such versatility, and it will be appreciated that the provision of two such systems is extremely expensive.

SUMMARY OF THE INVENTION

In accordance with the present invention, portable cable-type aircraft arresting apparatus is provided with the necessary equipment to enable use of the apparatus in a net-type arresting system, thus to provide a mobile self-contained unit which is selectively operable in a cable-type or net-type arresting system and is quickly and easily convertible from one system to the other. Two units are of course required in connection with an arresting system, and the two units in accordance with the present invention are structurally identical with respect to the equipment provided to enable both cable and net-type arresting systems. When the two units are appropriately located on opposite sides of a runway, each unit is suitably anchored in place, and all that is required thereafter is to set up the equipment for one or the other of the two available arresting systems.

More particularly in accordance with the present invention, the portable apparatus includes a trailer providing an equipment platform when anchored in place along a runway, and a stanchion assembly including a stanchion mast pivotally displaceable between horizontal and inclined positions relative to the platform. As will become apparent hereinafter, the horizontal mast position facilitates connection of the top strap of a net to the stanchion mast and also provides a storage position for the stanchion mast during transportation of the apparatus and during use of the apparatus in a cable-type arresting system. The bottom strap of the net is attached to the free end of the tape of the corresponding brake mechanism, which brake mechanism is operable in connection with use of the apparatus in both the cable-type and net-type systems, and the inclined position of the stanchion mast facilitates support of the net in the operational position thereof for engagement by a landing aircraft.

In accordance with a preferred embodiment of the invention, the free end of the tape from the energy absorber or brake mechanism extends laterally outwardly from one side of the platform and adjacent one end thereof, and the stanchion assembly is detachably mounted adjacent the corresponding side and end of the platform. The end of the tape extends laterally toward the corresponding side of the runway, whereby it will be appreciated that the apparatus on the opposite side of the runway is reversely oriented for the end of the tape of the brake mechanism thereon to extend laterally toward the corresponding side of the runway. When the stanchion assembly is mounted on the platform for transportation, the stanchion mast extends horizontally along the one side of the platform in its stored position. The stanchion mast of the apparatus on one side of the runway is displaceable to its inclined position with the mast assembly so mounted. In order to provide for the stanchion mast on the apparatus on the opposite side of the runway to be parallel to the mast on the one side of the runway when the two masts are in the inclined positions thereof, the stanchion assembly on the apparatus on the opposite side of the runway is detached, rotated 180° and then remounted on the corresponding platform. The latter remounting of the stanchion assembly is basically all that is necessary to prepare the apparatus for use in a net-type arresting system, other than the necessary procedures for attaching the net to the stanchion masts and bracing the stanchion masts in their inclined positions. All that is necessary, basically, in connection with converting to or back to a cable-type system is removal of the net and stanchion mast braces, lowering of the masts to their horizontal positions, and connection of a cable or pendant to the free ends of the brake unit belts.

It will be appreciated that, in addition to improved mobility and the provision of unitary apparatus having a dual arresting system capability, the present invention advantageously reduces both the time and cost heretofore required to provide such a dual system capability. Moreover, portability of the apparatus advantageously enables repositioning the apparatus relative to a given runway, or moving the apparatus to a different runway at the same landing site. The latter enables a user to continue to use the apparatus along a runway which, for example, becomes damaged after installation, or to selectively locate the apparatus along another runway so as to avoid the necessity of providing separate system capabilities for each runway.

It is accordingly an outstanding object of the present invention to provide improved portable aircraft arresting apparatus having both cable-type and net-type arresting system capability.

Another object is the provision of apparatus of the foregoing character in which a single structural unit carries equipment for both cable-type and net-type arresting systems including a net stanchion arrangement which enables two structurally identical units to be employed on opposite sides of a landing strip to selectively provide either a cable-type or net-type arresting system.

Yet another object is the provision of apparatus of the foregoing character which enables the installation of cable-type and net-type arresting systems along a given runway more economically and in less time than heretofore required.

Still a further object is the provision of apparatus of the foregoing character which enables relocation of the apparatus along a given runway at a given landing site, or transfer to another runway at the given site, thus optimizing versatility of the apparatus in connection with the provision of dual arresting system capability.

Still another object is the provision of apparatus of the foregoing character which is more efficient in connection with installation and use than apparatus heretofore required to provide dual arresting system capability.

Yet a further object is the provision of apparatus of the foregoing character including a transportable trailer or platform carrying a net stanchion assembly which is structured and structurally interrelated with the platform to enable two such units to be located on opposite sides of a runway with the stanchion masts of the two units inclined and parallel to one another to support a net therebetween.

A further object is the provision of apparatus of the foregoing character in which a self-contained stanchion assembly is removably mounted on the trailer or platform, thus enabling reverse mounting orientations for the stanchion assembly to facilitate installation of a net-type arresting system with an inclined net disposition.

BRIEF DESCRIPTION OF THE DRAWINGS

The foregoing objects, and others, will in part be obvious and in part pointed out more fully hereinafter in conjunction with the written description of a preferred embodiment illustrated in the accompanying drawings in which.

DESCRIPTION OF A PREFERRED EMBODIMENT

Figure 1:
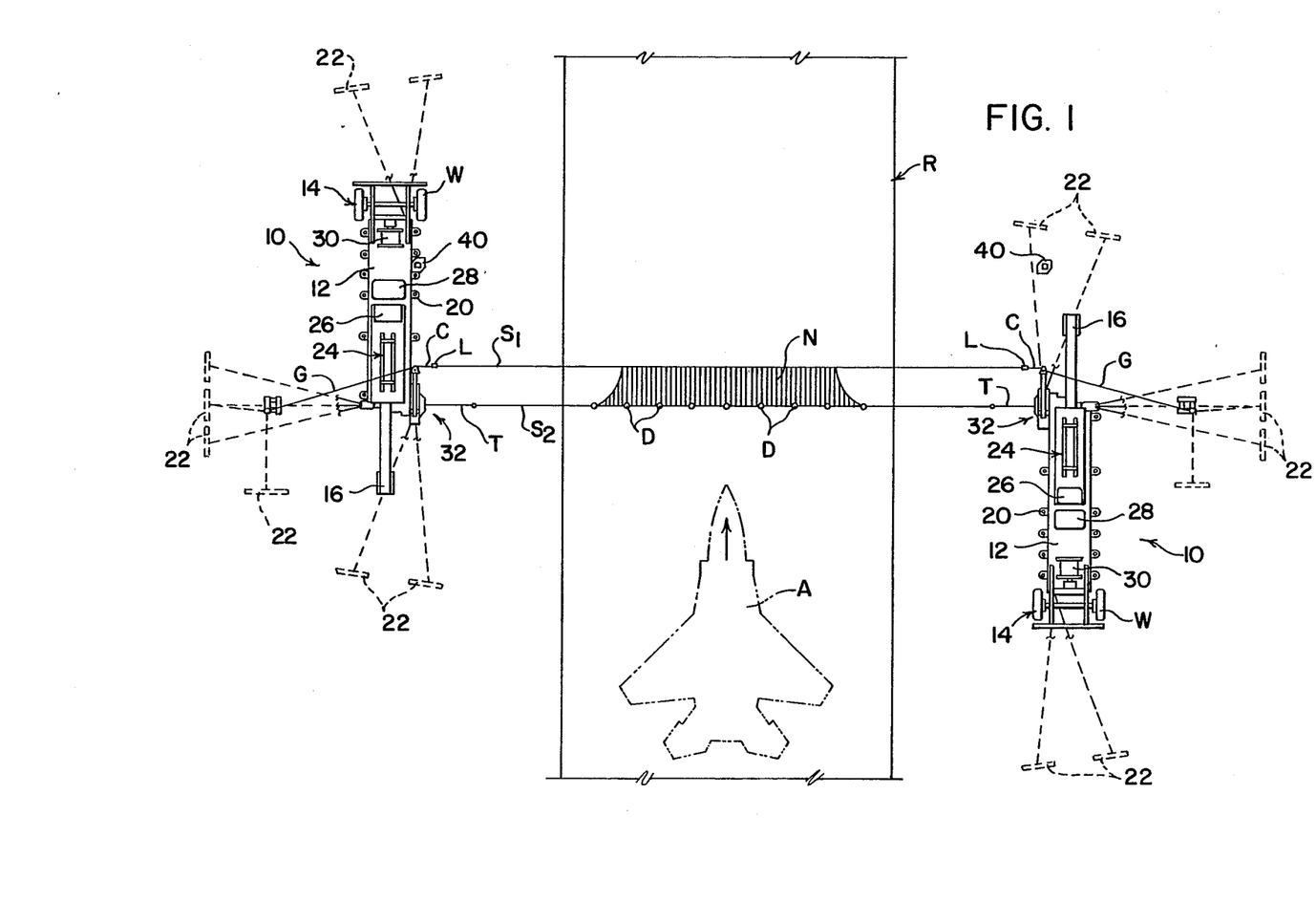
FIG. 1 is a plan view somewhat schematically illustrating a runway with apparatus according to the present invention providing a net-type arresting system thereacross.

Referring now in greater detail to the drawings wherein the showings are for the purpose of illustrating a preferred embodiment of the invention only and not for the purpose of limiting the invention, FIG. 1 illustrates a runway R provided on laterally opposite sides with aircraft arresting apparatus 10. Each apparatus 10 is a portable, self-contained unit, and the units are operable in pairs to selectively provide a cable-type or net-type arresting system as will become more apparent hereinafter. Each unit 10 includes a platform 12 having a wheel unit 14 at one end and a tow bar 16 at the other end enabling the unit to be towed in the manner of a trailer by a suitable towing vehicle. Wheel unit 14 includes wheels W which are elevatable and lowerable relative to platform 12 by means of a hydraulic wheel jack unit 18 so as to provide for wheeled support of the platform during towing and ground support of the platform when the unit is located adjacent runway R. When the platform is so positioned for ground support it is suitably anchored in place and, in the embodiment shown in FIG. 1, such anchoring is achieved by means of a plurality of anchor stakes 20 and cable-type ground anchor assemblies 22. It will be appreciated that other anchoring arrangements can be employed such as for example, anchoring to concrete foundations constructed for such purpose.

Each unit 10 includes an energy absorber or brake unit 24 operable in connection with both cable-type and net-type arresting systems as described more fully hereinafter, a tape rewind motor unit 26, a hydraulic supply unit 28, and a cable or pendant storage reel 30. Further, each of the units 10 is provided with a stanchion assembly 32 including a stanchion mast 34. The stanchion assembly is mounted adjacent one side and end of the platform for the stanchion mast axis to extend generally parallel to the one side of the platform. As will be described in greater detail hereinafter, stanchion assemblies 32 are mounted on the corresponding platform 12 in a manner which enables the corresponding stanchion mast 34 to be displaced from a horizontal position to the inclined net supporting position shown in FIG. 1. In the net supporting positions, the two stanchion masts are parallel in an inclined plane transverse to runway R and support upper strap $S_1$ of net N in a position offset from lower strap $S_2$ in the direction of landing of aircraft A as indicated by the arrow shown therewith. Each of the stanchion masts 34 is provided with a net tensioning cable C and the opposite ends of upper net strap $S_1$ are connected to the corresponding cable C by means of shear links L. Each of the energy absorber or brake units 24 includes a reel supported tape having a free end T extending laterally outwardly from the corresponding platform 12 toward the corresponding side of runway R and from a location on the one side of the platform beneath the area in which the stanchion assembly is mounted. The opposite ends of lower net strap $S_2$ are connected to tape ends T, and a plurality of anchor discs D are embedded in runway R and are connected with lower net strap $S_2$ by releaseable couplings therebetween. Guy wires G are attached to stanchion masts 34 adjacent the upper or outer ends thereof and are ground anchored laterally outwardly of the corresponding unit 10 to provide support of the stanchions against lateral inward displacement relative to runway R during an aircraft arresting operation.

Figure 2:
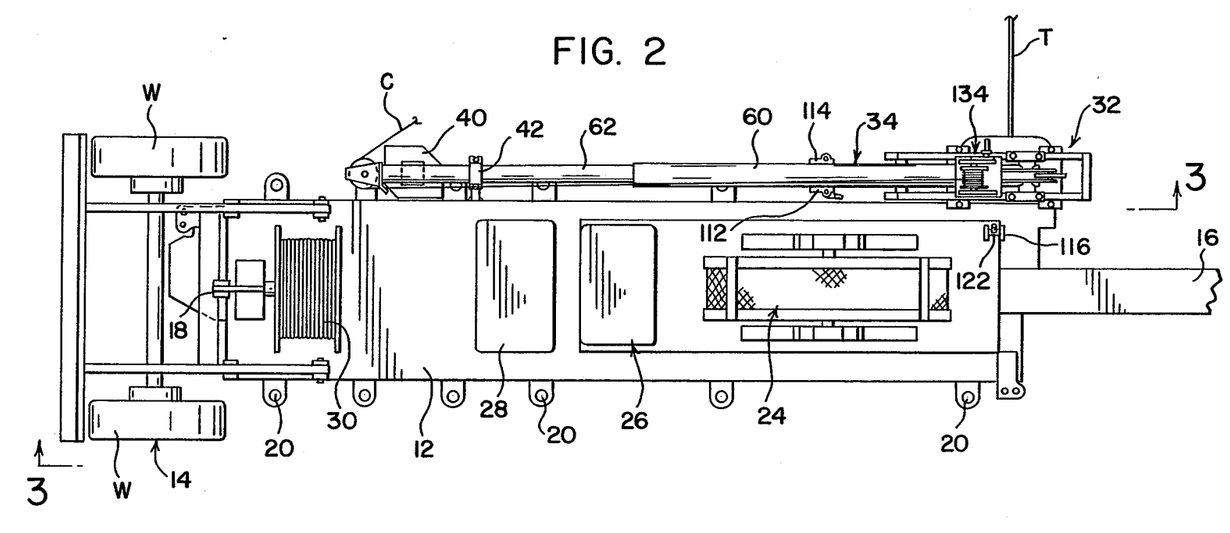
FIG. 2 is a plan view of portable apparatus according to the present invention.
Figure 3:
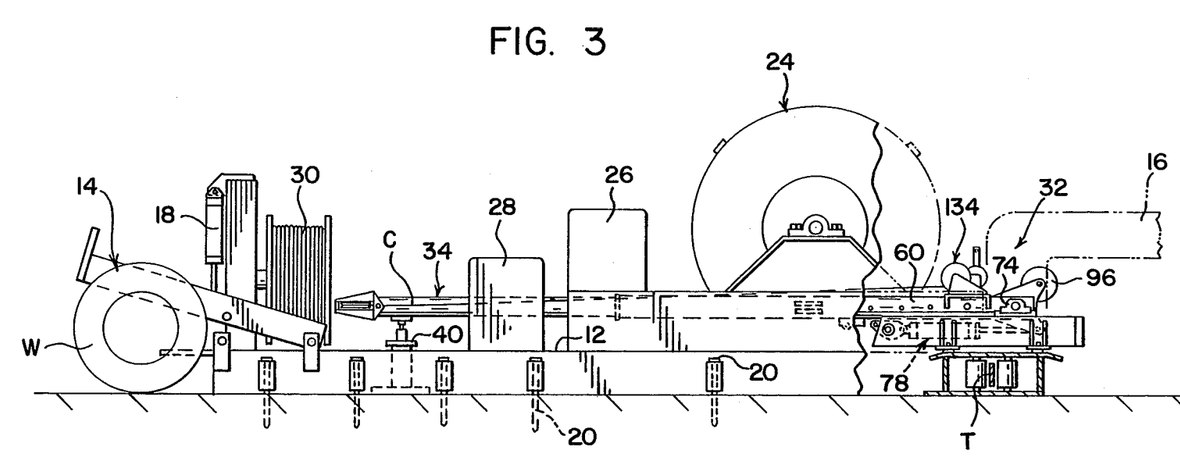
FIG. 3 is a sectional elevation view of the apparatus taken along line 3—3 in FIG. 2 and showing the stanchion mast in its horizontal position.
Figure 4:
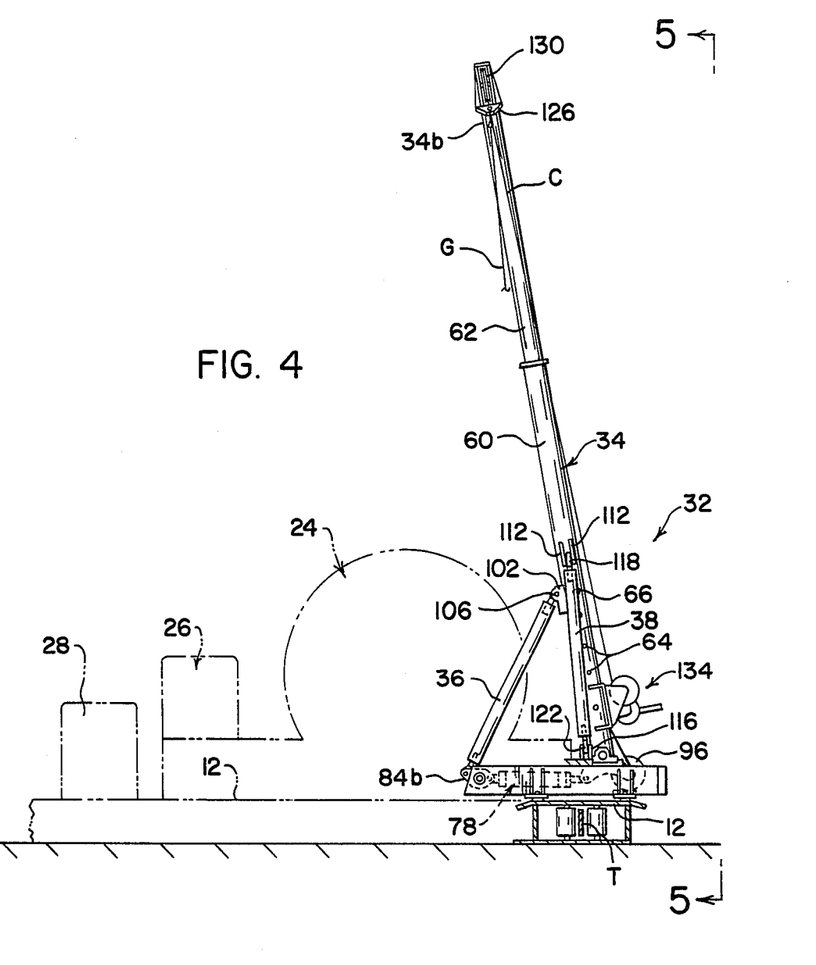
FIG. 4 is a sectional elevation view similar to FIG. 3 and showing the stanchion mast in its inclined position.

Stanchion assemblies 32 are of identical structure, and the structure and mounting thereof on platform 12 by which the foregoing net support capability is achieved will be more clearly understood from the ensuing description of FIGS. 2–8. Each stanchion assembly 32 includes a stanchion mast 34 which is supported for pivotal displacement between a horizontal position as shown in FIGS. 2 and 3 and an inclined position as shown in FIG. 4, and in which inclined position the mast is stabilized by detachable brace members 36 and 38. Mast 34 is disposed in the horizontal position during transportation of the trailer unit, during periods of use of the apparatus in connection with a cable-type arresting system, and to facilitate attachment of net N and guy wires G to the stanchion mast in connection with erecting a net-type system. A vertically adjustable mast support 40 is carried on platform 12 and is positioned on the ground in underlying relationship to mast 34 to support the mast in its horizontal position during periods other than when the mast is stored for transportation. During transportation, stanchion mast 34 is latched in place relative to platform 12 by means of a clamping assembly 42.

As best seen in FIGS. 5–8, stanchion assembly 32 includes a support frame comprised of longitudinally extending side members 44 and 46 interconnected at their opposite ends by cross members 48 and 50. Mounting plates 52 and 54 extend laterally beneath side members 44 and 46 and are welded or otherwise suitably secured thereto. Each mounting plate is provided on laterally opposite sides of the corresponding side member 44 and 46 with pairs of openings 56 for threaded fastener assemblies 58 by which the frame and thus stanchion assembly 32 is removably mounted on platform 12 for the purpose set forth hereinafter.

Figure 5:
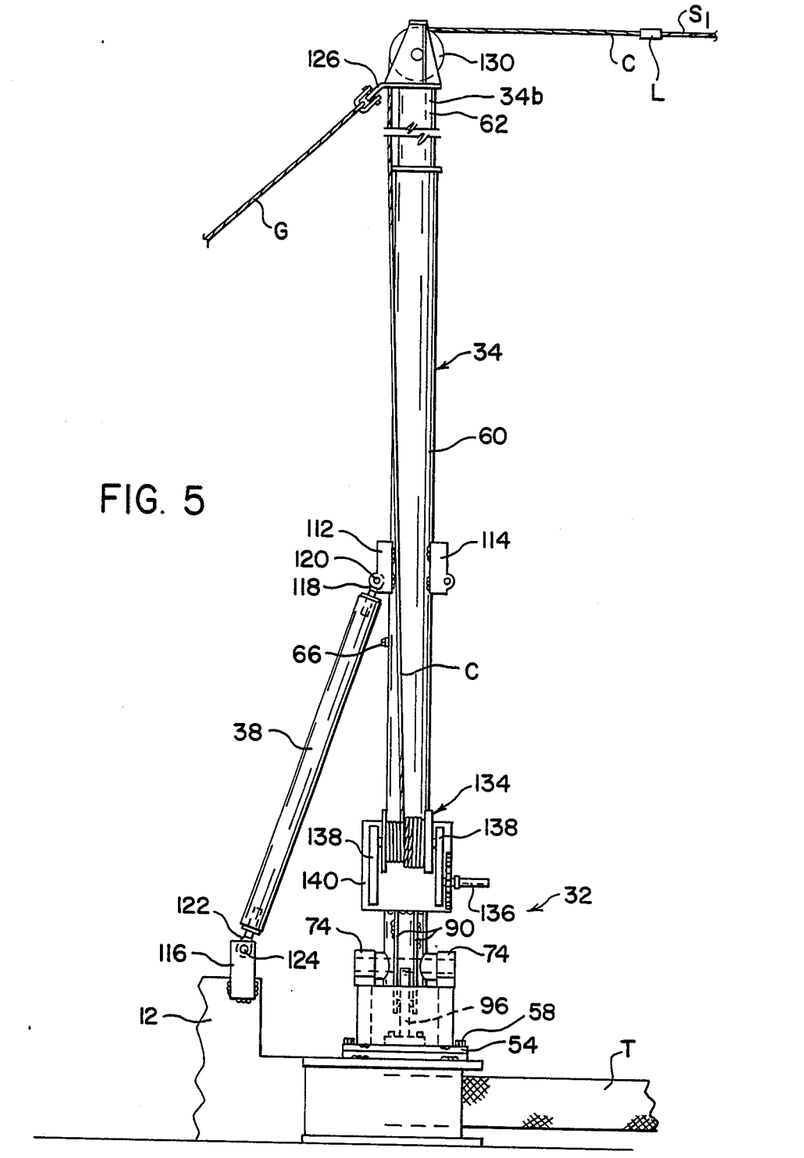
FIG. 5 is an end elevation view of the apparatus as seen in the direction of line 5—5 in FIG. 4.
Figure 6:
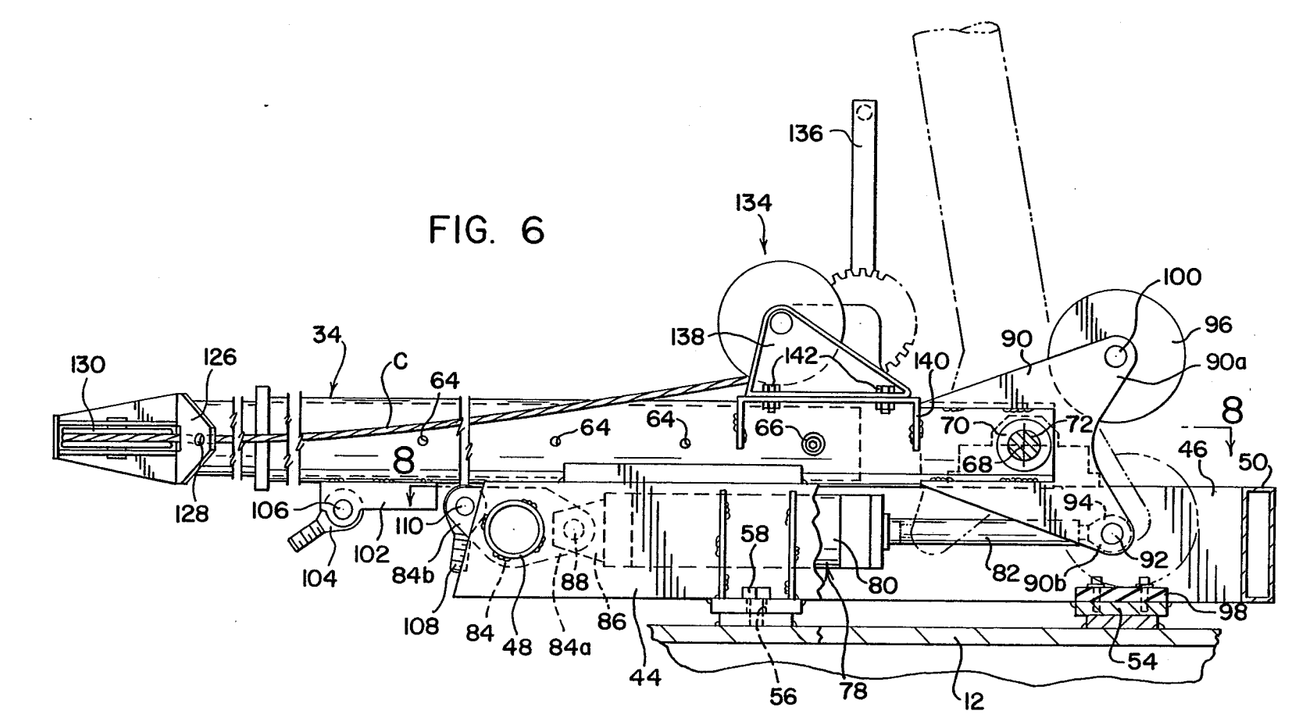
FIG. 6 is a side elevation view of the stanchion assembly.
Figure 7:
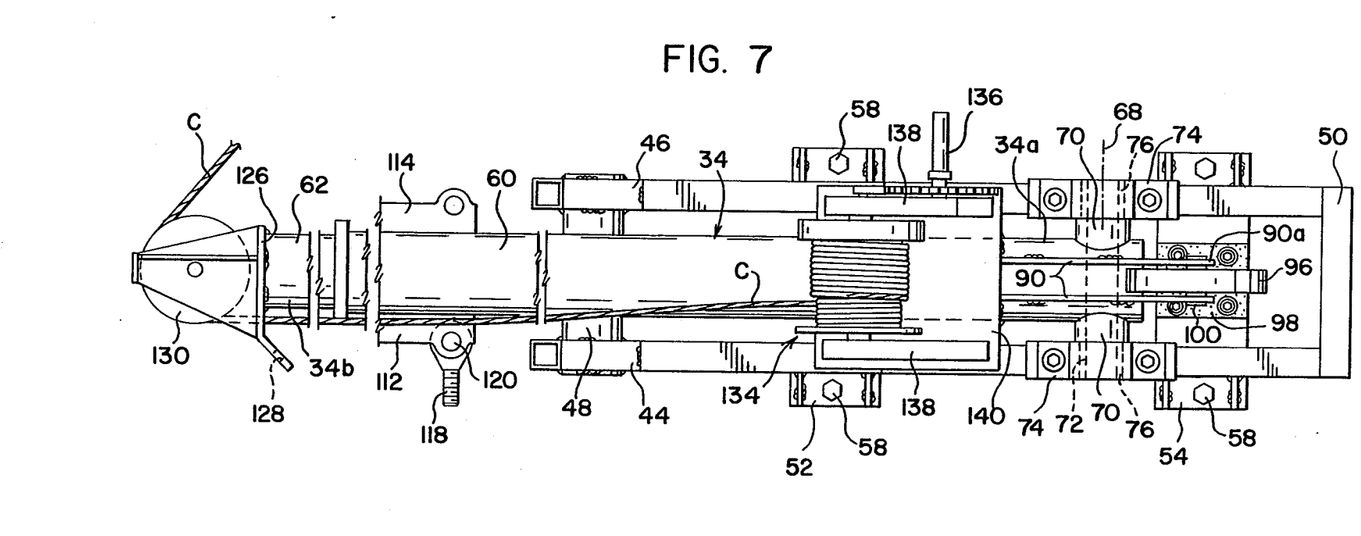
FIG. 7 is a plan view of the stanchion assembly in FIG. 6.
Figure 8:
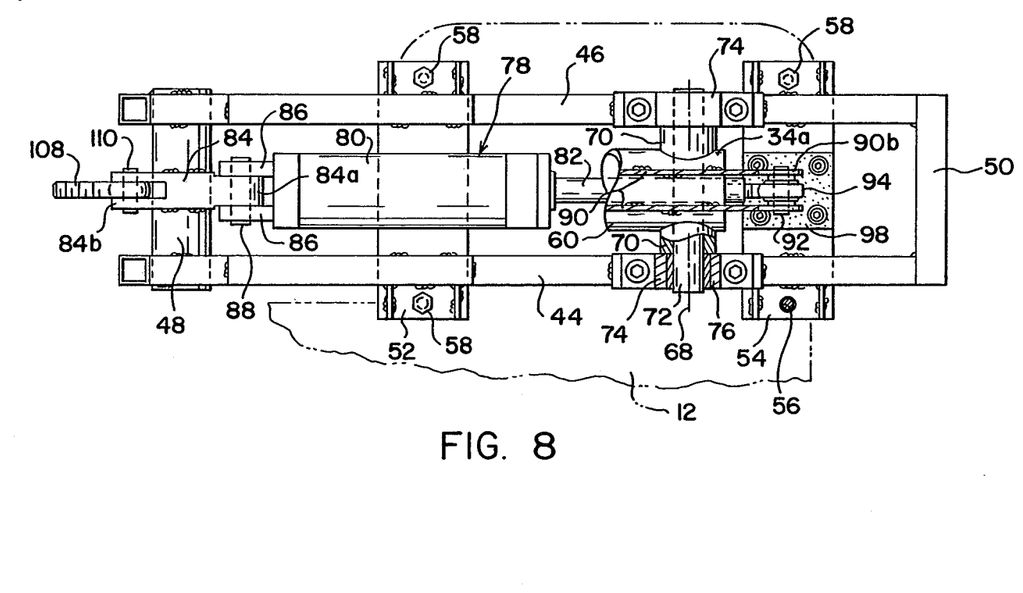
FIG. 8 is a plan view, partially in section, taken along line 8—8 in FIG. 6.

Stanchion mast 34 is preferably comprised of slidably interengaged telescoping outer and inner members 60 and 62, respectively, providing the mast with an inner end 34a and an outer end 34b. Such telescoping relationship facilitates shortening the mast during periods of transportation and non-use and extending the mast to provide a length required in connection with a given net-type arresting system. Furthermore, mast members 60 and 62 are preferably interconnectable against relative axial displacement therebetween at any one of a number of different positions of extension of member 62 relative to member 60, whereby the length of the mast is selectively adjustable. In the embodiment illustrated, such adjustability is achieved by providing mast member 60 with axially spaced apart, diametrically opposed pairs of openings 64 and by providing mast member 62 with a pair of diametrically opposed openings, not designated numerically, selectively alignable with openings 64 upon displacement of mast member 62 axially relative to member 60. As will be appreciated from FIGS. 5 and 6, a nut and bolt assembly 66 is adapted to extend through aligned openings in members 60 and 62 to retain the mast members in the retracted position as shown in FIG. 6 and in an extended position as shown in FIG. 5.

Inner end 34a of stanchion mast 34 is mounted on the support frame for pivotal movement about a horizontal axis 68 between the horizontal and inclined positions referred to above. More particularly in this respect, inner end 34a of the stanchion mast is provided with laterally extending support sleeves 70 which receive a pivot pin 72 which provides axis 68, and frame members 44 and 46 are provided with bearing blocks 74 and bearings 76 which receive the corresponding ends of pins 72. In the embodiment illustrated, displacement of stanchion mast 34 between the horizontal and inclined positions is achieved by means of a double acting hydraulic piston and cylinder unit 78 comprising a cylinder 80 and a piston rod 82 which, while not shown, has an inner end attached to and reciprocable with a piston member in cylinder 80. The end of cylinder 80 opposite piston rod 82 is pivotally secured to support frame member 48 by means of a mounting collar 84 on the frame member, a pair of arms 86 on cylinder 80, and a pivot pin 88 extending through arms 86 and inner end portion 84a of collar 84. Inner end 34a of stanchion mast 34 is provided with a pair of laterally spaced apart plate members 90 suitably secured to mast member 60 such as by welding and which, in the orientation shown in FIG. 6, have corresponding upper portions 90a and lower portions 90b. The outer end of piston rod 82 is pivotally secured between plates 90 by means of a pin 92 extending through lower portions 90b of the plates and an eye bolt 94 attached to the piston rod. While not shown, it will be appreciated that cylinder 80 is connected to hydraulic supply unit 28 on trailer 12 and through suitable controls to provide for the flow of hydraulic fluid under pressure between the supply source and opposite sides of the piston in cylinder 80. It will be further appreciated that fluid flow in the direction to displace the piston and thus piston rod 82 to the left in FIG. 6 operates to pivot stanchion mast 34 clockwise about axis 68 and thus from the horizontal to the inclined position thereof. It will likewise be appreciated that fluid flow in the opposite direction operates to displace piston rod 82 to the right in FIG. 6, thus to pivot stanchion mast 34 counterclockwise about axis 68 from the inclined to the horizontal position thereof.

As mentioned hereinabove, it is necessary for the stanchion mast to be inclined relative to platform 12 so as to support the net with the upper strap $S_1$ thereof offset relative to the lower strap in the direction of aircraft landing. Preferably, an arrangement is provided on the stanchion assembly for appropriately locating the mast in the inclined position upon displacement thereto. In the preferred embodiment, such locating is achieved by means of a stop wheel 96 on the stanchion mast and a stop pad 98 on the support frame. More particularly, stop wheel 96 is mounted between upper ends 90a of plates 90 by means of a pin 100, and stop pad 98 is bolted to the upper side of cross member 54 in vertical alignment with wheel 96. Therefore, upon displacement of stanchion mast 34 towards the inclined position as described above, stop wheel 96 engages stop pad 98 to locate stanchion mast 34 in the desired inclined orientation relative to platform 12 as shown in FIG. 4.

As also mentioned hereinabove, stanchion mast 34 is braced in its inclined position by means of brace members 36 and 38. Brace members 36 and 38 are detachable at least with respect to stanchion mast 34 and are connected thereto when the stanchion mast is in its inclined position. More particularly, brace member 36 is connected between the underside of mast member 60 and outer end 84b of collar 84 on frame member 48. For this purpose, mast member 60 is provided with a pair of laterally spaced apart mounting plates 102, and the upper end of brace member 36 is provided with an eye bolt 104 received between plates 102 and releaseably secured thereto by means of a removable pin 106. Similarly, the lower end of brace member 36 is provided with an eye bolt 108 received in a recess in outer end 84b of collar 84 and releaseably retained therein by means of a removable pin 110. Brace member 38 is disposed laterally inwardly of stanchion mast 34 and is connected between the mast and platform 12. For this purpose, mast member 60 is provided on laterally opposite sides thereof with pairs of mounting plates 112 and 114, the latter pair of plates serving the purpose set forth hereinafter, and platform 12 is provided with a pair of mounting plates 116. The upper end of brace member 38 is provided with an eye bolt 118 detachably interconnected with plates 112 by means of a removable pin 120, and the lower end of brace member 38 is provided with an eye bolt 122 detachably interconnected with plates 116 by means of a removable pin 124.

Outer end 34b of stanchion mast 34 is provided with a laterally inwardly extending flange 126 which is apertured at 128 to provide for attaching the stanchion mast to ground anchored guy wire G referred to hereinabove in connection with FIG. 1. Outer end 34b is also provided with a pulley 130 which supports a cable C having one end thereof attached to upper net strap $S_1$ through shear link L as further mentioned hereinabove in connection with FIG. 1. The other end of cable C is attached to the reel of a winch assembly 134 mounted on stanchion mast member 60 and having an operating lever 136 facing laterally outwardly of platform 12. Winch assembly 134 includes a supporting frame 138, and mast member 60 is provided with a mounting plate 140 which is welded or otherwise secured thereto. For the purpose set forth hereinafter, winch frame 138 is removably secured to mounting plate 140 by means of a plurality of nut and bolt assemblies 142.

With the foregoing description of apparatus 10 in mind, it will be appreciated with reference to FIG. 1 that it is necessary for the units 10 on opposite sides of runway R to be reversely oriented and longitudinally offset relative to one another so as to provide for braking tape lead-out ends T to extend inwardly toward the runway and to be transversely aligned across the runway, and to also provide for stanchion units 32 to be on the side of the platform adjacent the corresponding side of the runway. It will be further appreciated that when the units are initially moved into their positions on opposite sides of runway R the stanchion assembly of the unit on the left hand side of the runway with respect to the direction of landing is appropriately oriented for the stanchion mast to be inclined in the direction of aircraft landing when the stanchion mast is moved to its inclined position, whereas the stanchion assembly on the unit on the right hand side of the runway is reversely oriented with respect to the desired direction of inclination of the stanchion mast. All that is necessary to prepare the unit on the left hand side of FIG. 1 for the net erecting procedure is to position and ground anchor the corresponding rest pad assembly 40, remove nut and bolt assembly 66 from the stanchion mast, extend mast member 62 to provide the desired stanchion mast length and then reconnect members 60 and 62 with the nut and bolt assembly to interconnect the members against relative axial and rotational displacement.

In accordance with the present invention, and as will be appreciated from the foregoing description of the stanchion assembly, all that is necessary to appropriately orient the stanchion assembly on the unit on the right hand side of runway R is to position and anchor the corresponding rest pad assembly 40, remove nut and bolt assemblies 58 to release the stanchion support frame from platform 12, rotate the stanchion assembly 180° and then rebolt the support frame to the platform. Then, with the stanchion mast in the horizontal position, nut and bolt assembly 66 is removed from the stanchion mast and mast member 62 is withdrawn from member 60 to provide the desired stanchion mast length, and member 62 is rotated 180° so that guy wire flange 126 faces laterally away from the runway. Nut and bolt assembly 66 is then reinserted through the appropriate mast member openings to interconnect the mast members against relative axial or rotational displacement. Preferably, winch unit 134 is reversely mounted on support plate 140 for winch lever 136 to be on the side of the stanchion assembly facing runway R.

It will therefore be appreciated from the foregoing description that the structural interrelationship between platform 12 and stanchion assembly 32 of apparatus 10 enables selectively orienting the stanchion assembly for the stanchion mast 34 to extend in either one of opposite directions relative to a reference point on the platform. Stated another way, such orientation capability provides for the stanchion mast in its inclined position to selectively extend in opposite directions relative to a vertical reference plane on the platform and through the stanchion mast pivot axis.

When the two units are initially prepared as described above, guy wires G are attached to the guy wire flange 126 of the corresponding stanchion mast and to the guy wire ground anchors with the stanchion masts in their horizontal positions, and winch cables C are trained about the corresponding mast pulley 130 for the cable ends to extend toward runway R. Anchor discs D are then secured to the runway, and net N is laid out on the runway between the stanchion masts. The opposite ends of lower net strap $S_2$ are connected to the corresponding belt end T, and ties on the lower net strap are connected to the anchor discs D. The opposite ends of upper net strap $S_1$ are then attached to the corresponding winch cable C through shear links L, and the upper net strap is then tensioned by operating both stanchion winches. In connection with such tensioning, stanchion masts 34 are preferably displaced to the inclined positions thereof and both winches operated to achieve tensioning to provide a desired central line height for the net.

In order to prepare the system for an aircraft arresting operation, the hydraulic piston and cylinder unit 78 of each apparatus unit 10 is actuated to elevate the corresponding stanchion mast 34 to its inclined position which, as mentioned above, is determined by engagement of stop wheel 96 with stop pad 98 on the corresponding support frame. Brace members 36 and 38 of each stanchion assembly are then connected to the corresponding stanchion mast as described hereinabove. In connection with brace member 38 of the stanchion assembly on the unit on the right hand side of the runway in FIG. 1, it will be appreciated that the mounting plates 114 described hereinabove in connection with FIGS. 5–8 of the drawing facilitate connection of the brace member to the mast in the reoriented position of the stanchion mast assembly. Further, while both ends of brace members 36 and 38 are detachably connected to their corresponding support components, the lower ends of the brace members preferably remain connected to their support components and the brace members are pivoted about the lower ends so as to rest on the platform prior to raising the stanchion mast. Therefore, it is only necessary to pivot the brace members into position for attachment of the upper ends thereof to the masts. When the braces have been connected in place, the hydraulic power supply to each piston and cylinder unit 78 can be turned off.

In connection with arresting the travel of a landing aircraft A, the aircraft engages net N which is in the inclined position shown in FIG. 1, the cable-net shear links L break, and the net envelopes the aircraft. During such initial engagement of the aircraft with the net and to the point of shear link breakage, loads are taken by the two braces 36 and 38 of each stanchion mast and by the earth anchored guy wires G attached to each mast. Then, as the aircraft and net proceed down the runway in the direction of landing, the anchor disc assemblies D progressively release the lower net strap, and the tapes of the energy absorbers 24 are paid-out under the restraining braking force of the energy absorbing units to bring the aircraft to a controlled stop. To lower each of the stanchion masts 34 following an aircraft arresting operation, pins 106 at the upper ends of brace members 36 and pins 120 at the upper ends of brace members 38 are removed and the braces are pivoted about their lower ends away from the corresponding stanchion mast. Hydraulic piston and cylinder units 78 are then actuated to pivot the stanchion masts into their horizontal positions engaging rest pads 40.

In order to convert the apparatus to provide a cable-type arresting system, assuming the net to have been disconnected from the stanchion masts and tape ends T, basically all that is necessary is to remove the cable or pendant storage reel 30 from the platform and connect the ends of the pendant to tape ends T.

While considerable emphasis has been placed herein on the specific structure of the stanchion assembly and the structural interrelationship of the stanchion assembly with the platform by which selective orientation of the stanchion assembly and thus the stanchion mast relative to the platform is obtainable, it will be appreciated that other stanchion assemblies and structural interrelationships can be provided for achieving such selective orientation. Furthermore, it will be appreciated that many modifications of the stanchion assembly herein illustrated and described can be made without changing the functional characteristics thereof. In this respect, for example, arrangements other than telescoping tubes can be devised to provide for adjusting the length of the stanchion mast, and locking of the mast components in a given relative position therebetween can be achieved other than by the nut and bolt assembly herein disclosed. Likewise, displacement of the stanchion mast between the horizontal and elevated positions can be achieved other than through the use of a hydraulic piston and cylinder drive unit, and locating of the stanchion mast in the inclined position can be achieved other than through the interengagement between a stop wheel and stop pad as described herein. These and other changes in the disclosed embodiment, as well as other embodiments of the invention, will be obvious and suggested to those skilled in the art upon reading the foregoing description of a preferred embodiment. Accordingly, it is to be distinctly understood that the foregoing descriptive matter is to be interpreted merely as illustrative of the present invention and not as a limitation.

Having thus described the invention, it is claimed:

1. Portable aircraft arresting apparatus comprising, portable platform means having opposite ends, means including energy absorber means on said platform means for said apparatus to be operable in a cable-type aircraft arresting system, means including said energy absorber means and stanchion mast means on said platform means for said apparatus to be operable in a net-type aircraft arresting system, frame means mounted on said platform means and supporting said stanchion mast means for pivotal displacement about a horizontal axis transverse to said opposite end and between horizontal and inclined positions relative to said platform means, said frame means having selectable first and second mounting positions relative to said platform means, said mast means in said first position of said frame means and in said horizontal position of said mast means being in a storage position between said opposite ends of said platform means, said mast means in said first and second positions of said frame means and in said inclined position of said mast means being inclined in opposite directions relative to said platform means, and hydraulic piston and cylinder means between said mast means and said frame means for pivoting said mast means about said axis between said horizontal and inclined positions, said mast means having outer and inner ends, and said axis being between said outer and inner ends and adjacent said inner end.

2. Apparatus according to claim 1, and means bracing said stanchion mast means in said inclined position against displacement relative to said platform means.

3. Apparatus according to claim 1, wherein said stanchion mast means is extendable and retractable in the direction transverse to said axis.

4. Apparatus according to claim 1, and interengaging stop means on said inner end and said frame means to locate said mast means in said inclined position relative to said platform means.

5. Apparatus according to claim 4, wherein said stop means includes a stop wheel on said inner end of said mast means and a stop pad on said frame means.

6. Apparatus according to claim 4, wherein said mast means includes axially slidably interengaged mast members providing for said mast means to be adjustable in length, and means to interconnect said mast members in any one of a plurality of different relative axial positions to provide selectable lengths for said mast means.

7. Apparatus according to claim 4, and further including first and second brace members respectively between said mast means and said frame means and between said mast means and said platform means when said mast means is in said inclined position, each said brace member being detachably connected at least to said mast means.

8. Apparatus according to claim 7, wherein said mast means includes axially slidably interengaged mast members providing for said mast means to be adjustable in length, and means to interconnect said mast members in any one of a plurality of different relative axial positions to provide selectable lengths for said mast means.

9. Apparatus according to claim 8, and winch means on said mast means, said winch means including crank means, and means for selectively mounting said winch means on said mast means for said crank means to be accessible from opposite sides of said mast means.

10. Portable aircraft arresting apparatus comprising, transportable platform means having opposite ends, means including energy absorber means on said platform means for said apparatus to be operable in a cable-type aircraft arresting system, means including said energy absorber means and a stanchion assembly on said platform means for said apparatus to be operable in a net-type aircraft arresting system, said stanchion assembly including frame means having opposite ends and selectively mountable on said platform means for said opposite ends of said frame means to be reversely oriented, a stanchion mast extending in the direction between said opposite ends of said frame means and having inner and outer ends, means supporting said inner end of said stanchion mast on said frame means for pivotal displacement of said mast about an axis transverse to said direction between said opposite ends of said frame means, fluid operated piston and cylinder means having opposite ends connected one to said mast and the other to said frame means and being operable to pivot said mast about said axis between horizontal and inclined positions relative to said platform means, the end of said piston and cylinder means connected to said mast being connected thereto between said axis and said inner end of said mast, said axis being closer to one end of said frame means than the other end end thereof and the end of said piston and cylinder means connected to said frame means being connected to said other end of said frame means, stop means on said mast and said frame means interengaging to locate said mast in said inclined position, and means to brace said mast in said inclined position against displacement relative to said frame means and platform means, said mast in one of said orientations of said frame means and in said horizontal position of said mast being disposed in a storage position between said opposite ends of said platform means.

11. Apparatus according to claim 10, wherein said stanchion mast comprises first and second telescopically and slidably interengaged mast members, and means to interconnect said mast members against relative displacement in any one of a plurality of selectable relative axial positions to provide for said mast to be adjustable in length.

12. Apparatus according to claim 11, and winch means on said mast, said winch means including crank means, and means for selectively mounting said winch means on said mast for said crank means to be accessible from opposite sides of said mast.

13. Apparatus according to claim 11, wherein said means to brace said mast includes a first brace member between said mast and said other end of said frame and a second brace member between said mast and said platform means and extending laterally of said mast, each said first and second brace members having an end detachably fastened to said mast, and said mast including means on laterally opposite sides thereof for fastening said end of said second brace member thereto.

* * * * *